(12) United States Patent
Seo et al.

(10) Patent No.: US 9,076,093 B2
(45) Date of Patent: Jul. 7, 2015

(54) METAL CARD AND MANUFACTURING METHOD THEREOF

(75) Inventors: Hee Yong Seo, Hwaseong-si (KR); Young Jin Park, Asan-si (KR)

(73) Assignee: BIOSMART CORPORATION (KR)

( * ) Notice: Subject to any disclaimer, the term of this patent is extended or adjusted under 35 U.S.C. 154(b) by 0 days.

(21) Appl. No.: 14/131,260

(22) PCT Filed: Jul. 6, 2012

(86) PCT No.: PCT/KR2012/005388
§ 371 (c)(1),
(2), (4) Date: Jan. 7, 2014

(87) PCT Pub. No.: WO2013/009050
PCT Pub. Date: Jan. 17, 2013

(65) Prior Publication Data
US 2014/0144993 A1    May 29, 2014

(30) Foreign Application Priority Data

Jul. 8, 2011 (KR) .................. 10-2011-0067777
Jul. 6, 2012 (KR) .................. 10-2012-0073660

(51) Int. Cl.
*G06K 19/077* (2006.01)
*G06K 19/06* (2006.01)

(52) U.S. Cl.
CPC .... *G06K 19/07728* (2013.01); *G06K 19/06196* (2013.01)

(58) Field of Classification Search
CPC ............... G06K 19/07728; G06K 19/06196; G06K 19/02; G06K 19/07745; Y10T 29/49993; Y10T 29/49826; Y10T 29/4913; Y10T 29/49982; H01L 2924/0002
See application file for complete search history.

(56) References Cited

U.S. PATENT DOCUMENTS

2004/0217178 A1* 11/2004 Lasch et al. ............ 235/488
2009/0294543 A1* 12/2009 Varga et al. ............ 235/492

FOREIGN PATENT DOCUMENTS

| KR | 1020090049164 | 5/2009 |
| KR | 1020090054502 | 6/2009 |
| KR | 1020090072104 | 7/2009 |
| KR | 1020100066148 | 6/2010 |
| KR | 1020100100139 | 9/2010 |

OTHER PUBLICATIONS

International Search Report—PCT/KR2012/005388 dated Feb. 26, 2013.

* cited by examiner

*Primary Examiner* — Sonji Johnson
(74) *Attorney, Agent, or Firm* — Cantor Colburn LLP (57) ABSTRACT

Provided is a metal card including a metal card sheet made of duralumin and an anodized layer formed by anodizing a surface of the metal card sheet, wherein a background color or pattern of the metal card is determined according to a composition of electrolyte of the anodizing for forming the anodized layer.

15 Claims, 14 Drawing Sheets

METAL CARD AND MANUFACTURING METHOD THEREOF

TECHNICAL FIELD

The present invention relates to a metal card, and more particularly, to a metal card having a noble appearance and an insulated surface and enabling a contact IC chip to be attached and a method of manufacturing the metal card.

BACKGROUND ART

Credit cards have been used for the purpose of identification, payment, credit inquiry, and the like. Recently, in addition to a service, a discount rate, and a mileage point of a credit car, a pattern and design of the credit card have become important factors of selecting the credit card. Therefore, card manufacturers have tried to satisfy various clients' requests by contriving cards having much difference in functions as well as in pattern and design of the credit cards.

As an example of the approaches, Korean Patent Application No. 10-2007-0121197 is disclosed. The patent document discloses a card including a metal sheet for a metal card and a fixing piece coupled with the metal sheet, so that improved nobleness can be provided to the card due to its gloss unique to a metal.

However, although the gloss unique to a metal can be provided to the above-described metal card, since the surface of the credit card is simple in pattern and design, there is a limitation in satisfying various clients' requests.

In addition, since the above-described metal card cannot secure insulation, there is a problem in that it is impossible to employ a contact IC chip. Recently, in order to prevent illegal reproduction of credit cards using magnetic stripes, the contact IC chips need to be configured. The securing the insulation of the metal card has been actively researched.

In addition, although the above-described metal card has high strength, there is a problem in that it is difficult to stably attach a back-surface attachment member such as a magnetic film and a signature plate on a surface of the metal card. This is because an adhesive force of an adhesive with respect to the metal card is weaker than the adhesive having a strong adhesive force with respect to a plastic card.

DISCLOSURE

Technical Problem

The present invention is to provide a metal card having various background colors and patterns on a surface of the metal card formed by manufacturing a metal card sheet by using a duralumin plate and performing multiple times of anodizing and etching processes on the metal card sheet and a method of manufacturing the metal card.

In addition, the present invention is to provide a metal card capable of insulating the metal card and a contact IC chip by anodizing an area of a duralumin plate and attaching the contact IC chip on the metal card by applying with an adhesive resin between the contact IC chip and the metal card and capable of stably attaching the contact IC chip on the metal card by roughening a contact portion of the anodized area being in contact with the contact IC chip through laser sending and applying with an adhesive resin so as to improve an adhesive force and a method of manufacturing the metal card.

In addition, the present invention is to provide a metal card capable of stably attaching a back-surface attachment member on the metal card by etching an area for attachment of the back-surface attachment member on a surface of a duralumin plate and attaching the back-surface attachment member on the etched area through an adhesive and a method of manufacturing the metal card.

In addition, the present invention is to provide a metal card capable of stably attaching a back-surface attachment member on the metal card by performing laser sanding on an area for attachment of the back-surface attachment member on a surface of a duralumin plate, applying with a primer, and transferring the back-surface attachment member to a primer-applied area and a method of manufacturing the metal card.

Technical Solution

According to an aspect of the present invention, there is provided a metal card including: a metal card sheet made of duralumin; and an anodized layer formed by anodizing a surface of the metal card sheet, wherein a composition of electrolyte of the anodizing for forming the anodized layer is determined according to a background color or pattern of the metal card.

Advantageous Effects

According to the present invention, it is possible to provide a metal card having various colors and patterns on a surface of the metal card formed by manufacturing a metal card sheet by using a duralumin plate and performing multiple times of anodizing and etching processes on the metal card sheet.

In addition, according to the present invention, it is possible to provide a metal card capable of insulating the metal card and a contact IC chip by anodizing the surface of a duralumin plate and attaching the contact IC chip on the metal card by applying with an adhesive resin between the contact IC chip and the metal card and capable of stably attaching the contact IC chip on the metal card by roughening a contact portion of the anodized surface being in contact with the contact IC chip through laser sending and applying with an adhesive resin so as to improve an adhesive force.

In addition, according to the present invention, it is possible to provide a metal card capable of stably attaching a back-surface attachment member on the metal card by etching an area for attachment of the back-surface attachment member on a surface of a duralumin plate and attaching the back-surface attachment member on the etched area through an adhesive.

In addition, according to the present invention, it is possible to provide a metal card capable of stably attaching a back-surface attachment member on the metal card by performing laser sanding on an area for attachment of the back-surface attachment member on a surface of a duralumin plate, applying with a primer, and transferring the back-surface attachment member to a primer-applied area.

BEST MODE

The present invention is to provide a noble metal card having various background colors and patterns on a surface of the metal card formed by manufacturing a metal card sheet by using a duralumin plate and performing multiple times of anodizing and etching on the metal card sheet.

In addition, the present invention is to provide a metal card capable of insulating the metal card and a contact IC chip by anodizing the surface of a duralumin plate and attaching the contact IC chip on the metal card by applying with an adhesive resin between the contact IC chip and the metal card and capable of stably attaching the contact IC chip on the metal card by roughening a contact portion of the anodized surface being in contact with the contact IC chip through laser sanding and applying with an adhesive resin so as to improve an adhesive force.

In addition, the present invention is to provide a metal card capable of stably attaching a back-surface attachment member on the metal card by etching an area for attachment of the back-surface attachment member on a surface of a duralumin plate and attaching the back-surface attachment member on the etched area through an adhesive.

In addition, the present invention is to provide a metal card capable of stably attaching a back-surface attachment member on the metal card by performing laser sanding on an area for attachment of the back-surface attachment member on a surface of a duralumin plate, applying with a primer, and transferring the back-surface attachment member to a primer-applied area.

The metal card and the method of manufacturing the metal card according to embodiments of the present invention will be described in detail with reference to the drawings.

First Embodiment

Metal Card Manufacturing Process

Figure 1:
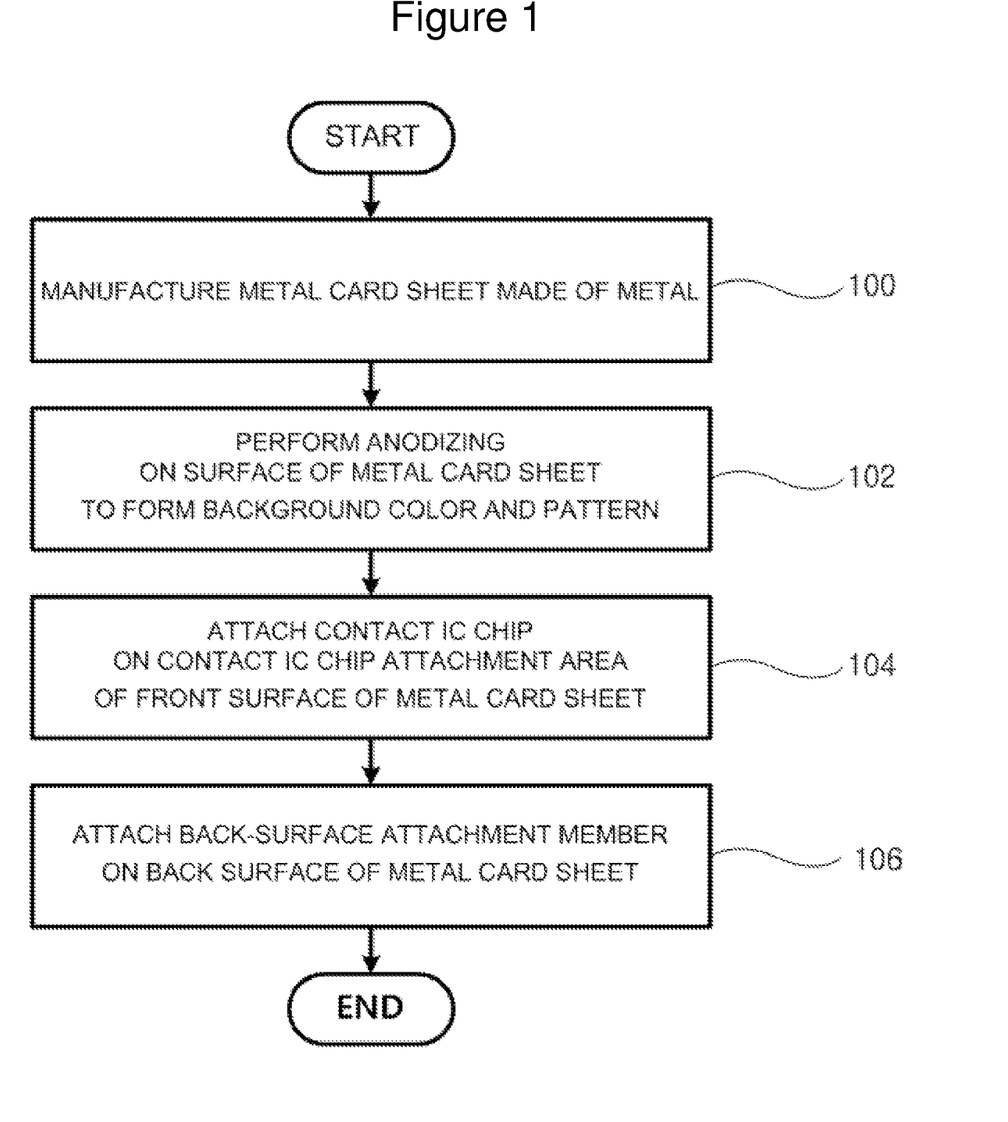
FIG. 1 is a diagram illustrating a process of manufacturing a metal card according to a first embodiment of the present invention.

Referring to FIG. 1 illustrating a metal card manufacturing process according to a first embodiment of the present invention in brief, first, a duralumin metal card sheet is manufactured in order to manufacture a metal card (Step 100).

An anodized layer is formed by performing multiple times of anodizing and etching on a surface of the duralumin metal card sheet so as to form a background color and pattern and insulate the surface of the metal card sheet (Step 102).

A contact IC chip attachment area is formed on the front surface of the metal card sheet on which the background color and pattern are formed, and a contact IC chip is attached on the contact IC chip attachment area (Step 104).

Next, magnetic-film attachment area and signature-plate attachment area are formed on the back surface of the metal card sheet, and a back-surface attachment member such as a magnetic film and a signature plate is attached on the magnetic-film and signature-plate attachment areas (Step 106).

As a result, the metal card according to the first embodiment of the present invention is manufactured.

Now, among the detailed processes of the metal card manufacturing process, the background color/pattern forming process (Step 102), the contact IC chip attaching process (Step 104), and the magnetic film/signature plate attaching process (Step 106) will be described more in detail.

<Background Color/Pattern Forming Process>

Figure 2:
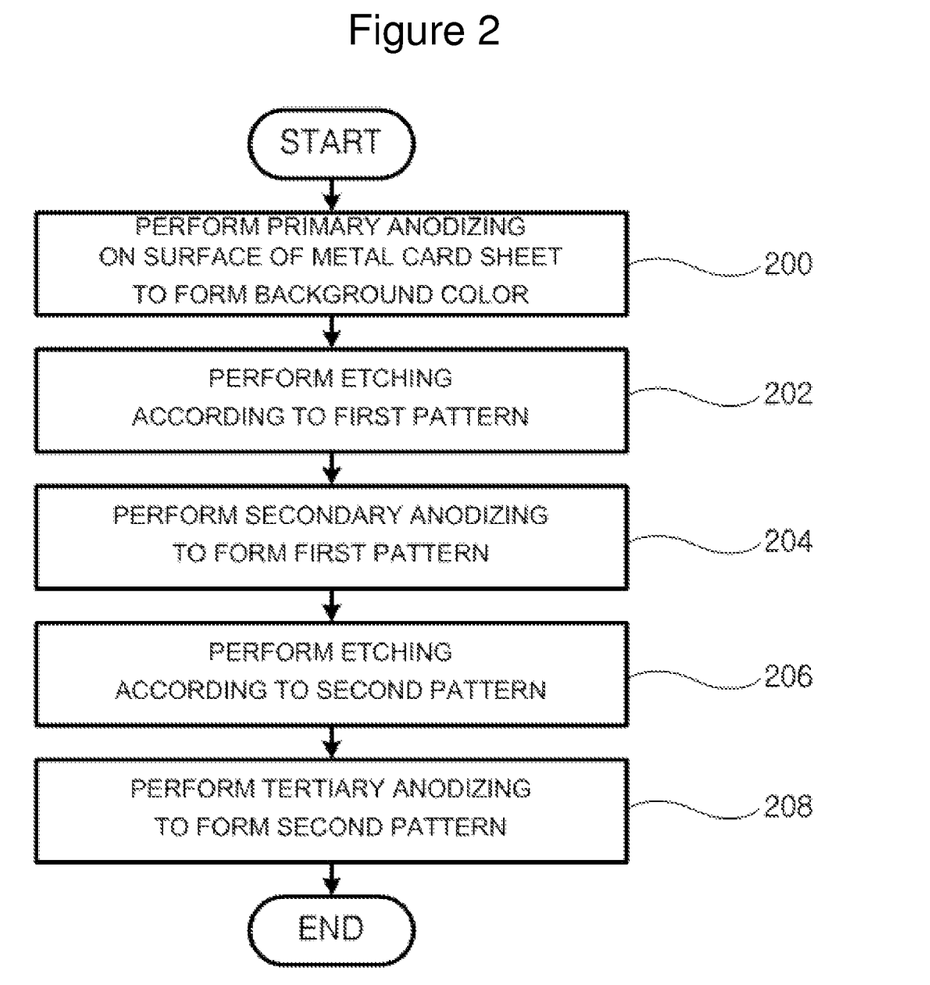
FIG. 2 is a diagram illustrating a process of forming a background color and pattern on a surface of the metal card according to the first embodiment of the present invention.

The process of forming a background color and pattern on the surface of the metal card according to the embodiment of the present invention will be described with reference to FIGS. 2 to 4.

Figure 3:
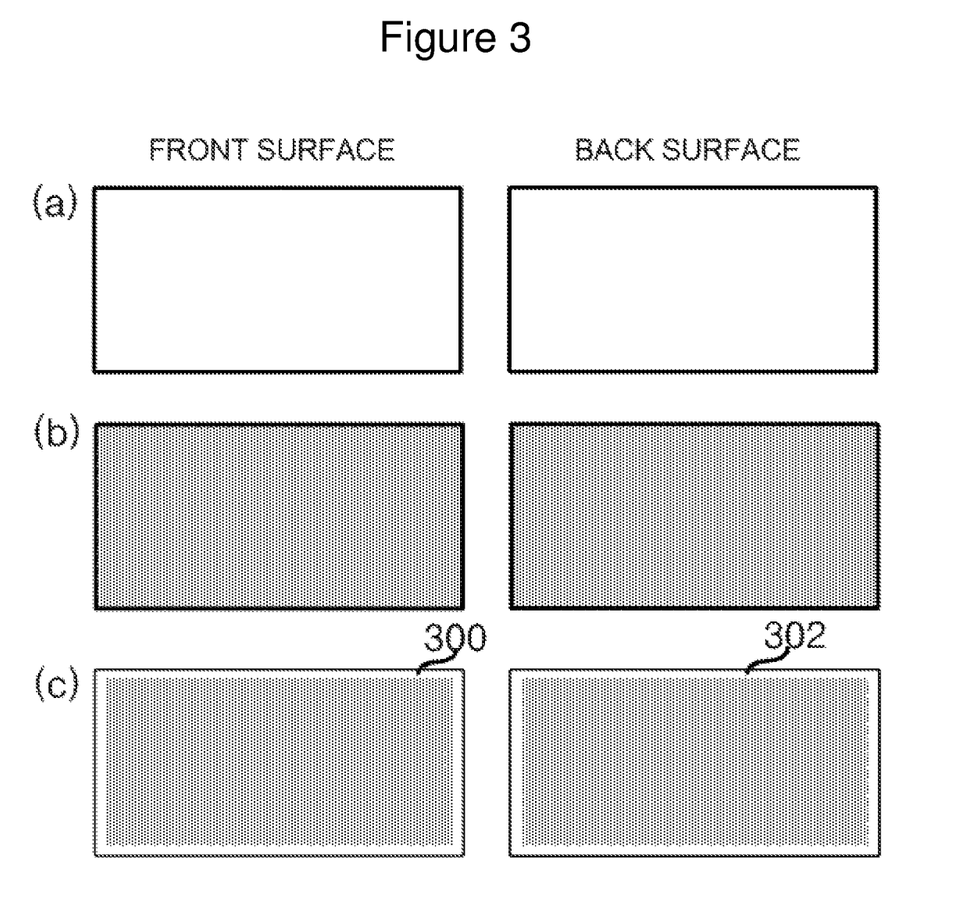
FIGS. 3 and 4 are diagrams exemplifying a process of forming a background color and pattern on the surface of the metal card according to the first embodiment of the present invention.
Figure 4:
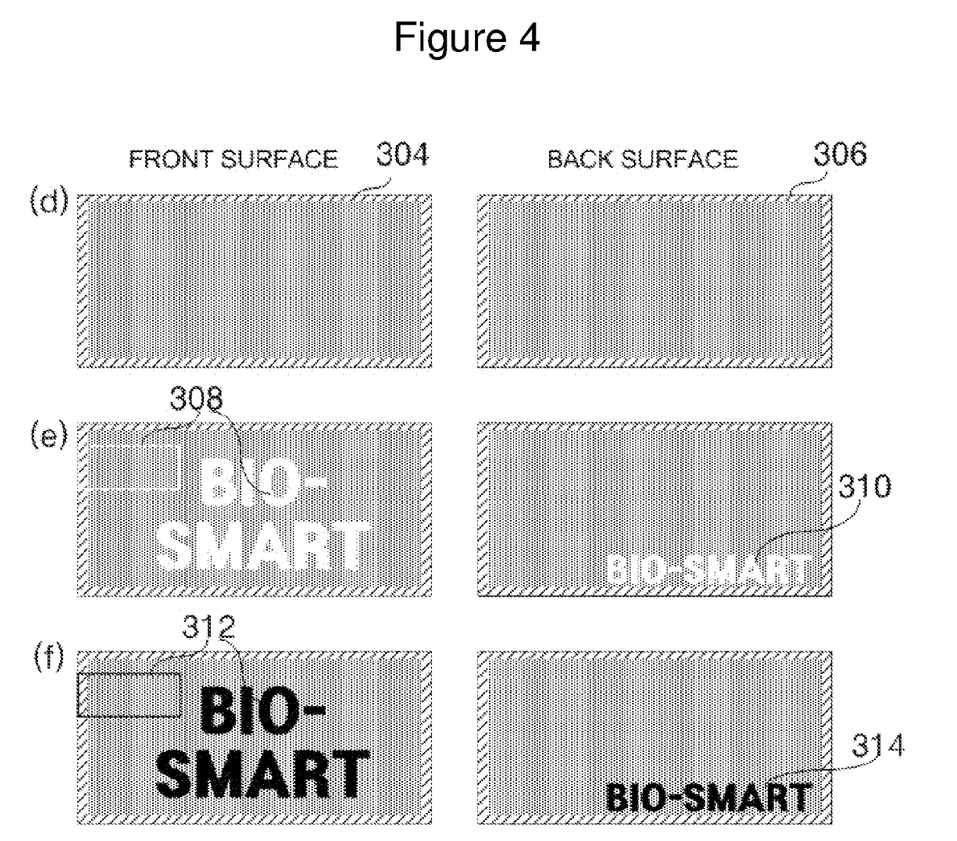

Front and back surfaces of the duralumin metal card sheet are illustrated in (a) of FIG. 3. Since the duralumin metal card sheet has a high strength and a good elasticity capable of returning to an original state after bending, so that a quality of the card can be improved.

A primary anodizing is performed on the surface of the duralumin metal card sheet by using first electrolyte in order to form the background color (Step 200). The background color formed through the primary anodizing is illustrated in (b) of FIG. 3.

On the entire surface of the metal card sheet on which the background color is formed as described above, a portion corresponding to a first pattern is etched (Step 202). Therefore, as illustrated in (c) of FIG. 3, an anodized layer of the portion 300, 302 corresponding to the first pattern is etched, so that duralumin is exposed.

A secondary anodizing is performed on the metal card sheet, where the portion 300, 302 corresponding to the first pattern is etched, by using a second electrolyte different from the first electrolyte of the primary anodizing for forming the first pattern (Step 204). Therefore, as illustrated in (d) of FIG. 4, only the portion 300, 302 corresponding to the first pattern is anodized by the second electrolyte, so that the first pattern having a color different from the background color is formed.

On the metal card sheet on which the first pattern is formed, a portion corresponding to the second pattern is etched (Step 206). Therefore, as illustrated in (e) of FIG. 4, an anodized layer of the portion 308, 310 corresponding to the second pattern is etched, so that duralumin is exposed.

A tertiary anodizing is performed on the metal card sheet, where the portion 308, 310 corresponding to the second pattern is etched, by using a third electrolyte different from the first and second electrolytes forming the secondary pattern (Step 208). Therefore, as illustrated in (f) of FIG. 4, only the portion 308, 310 corresponding to the second pattern is anodized by the third electrolyte, so that the second pattern 312, 314 having a color different from the background color and the color of the first pattern is formed.

As described above, in the present invention, a noble pattern is formed on the surface of the metal card by performing multiple times of anodizing and etching by using electrolytes having various compositions, and an insulating process is performed on the surface of the metal card.

In addition, although only three times of the anodizing and two times of the etching are performed in the above-described example, the more times of the anodizing and etching may be performed according to the number of colors of the patterns which are to be formed on the metal card.

The electrolyte used for the anodizing is determined according to the colors and texture of the to-be-formed patterns.

More specifically, during the anodizing in the present invention, a duralumin plate is anodized in a container containing an electrolyte. The color and texture of an oxide layer formed on the surface of the duralumin plate depend on a composition and concentration of the electrolyte, a type of an additive, temperature, voltage, current, and a processing time. Therefore, in the present invention, a pattern having desired color and texture is formed on the surface of the duralumin plate by changing any one of the composition and concentration of the electrolyte, the type of an additive, the temperature, the voltage, the current, and the processing time.

As an electrolyte used for the anodizing, a sodium hydroxide, sulfuric acid, and a mixed solution for metal surface treatment such as ANOD AL CLEAN-J™, ANOD BLACK MLW 903™, ANOD BRIGHT #800™, and ANOD SEALING HL-568™ produced by ANOD Korea™ may be employed.

<Contact IC Chip Attaching Process>

Figure 5:
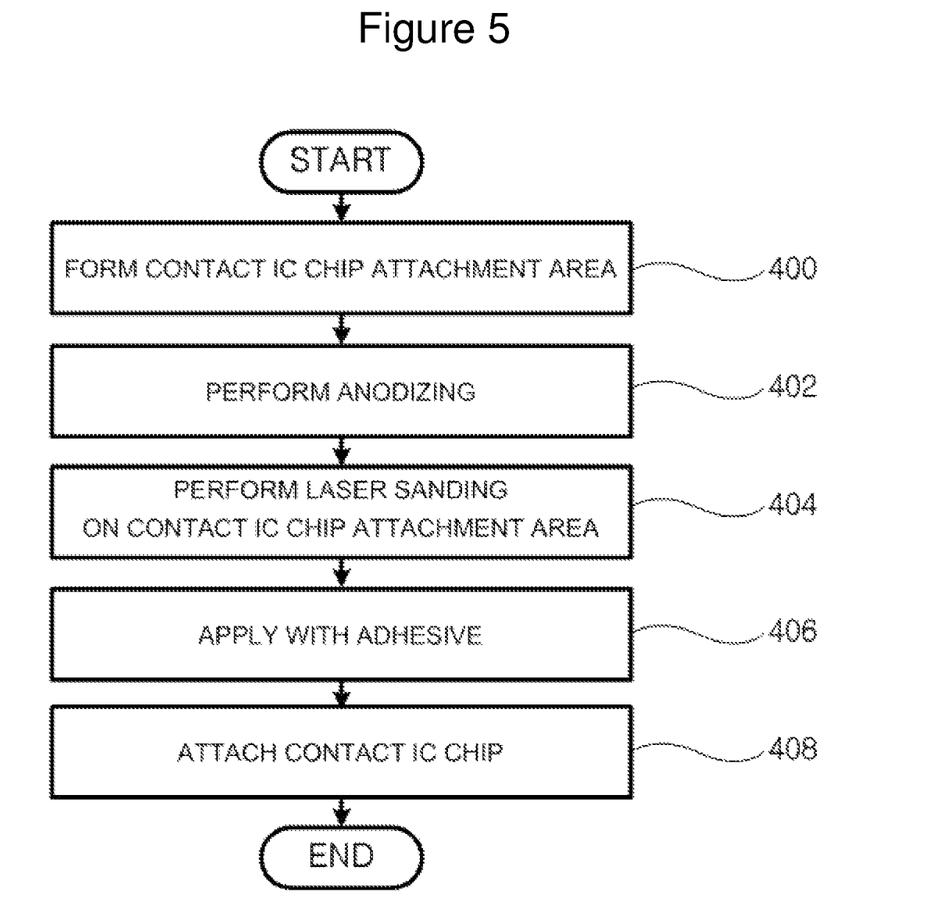
FIG. 5 is a diagram illustrating a process of attaching a contact IC chip on the metal card according to the first embodiment of the present invention.
Figure 6:
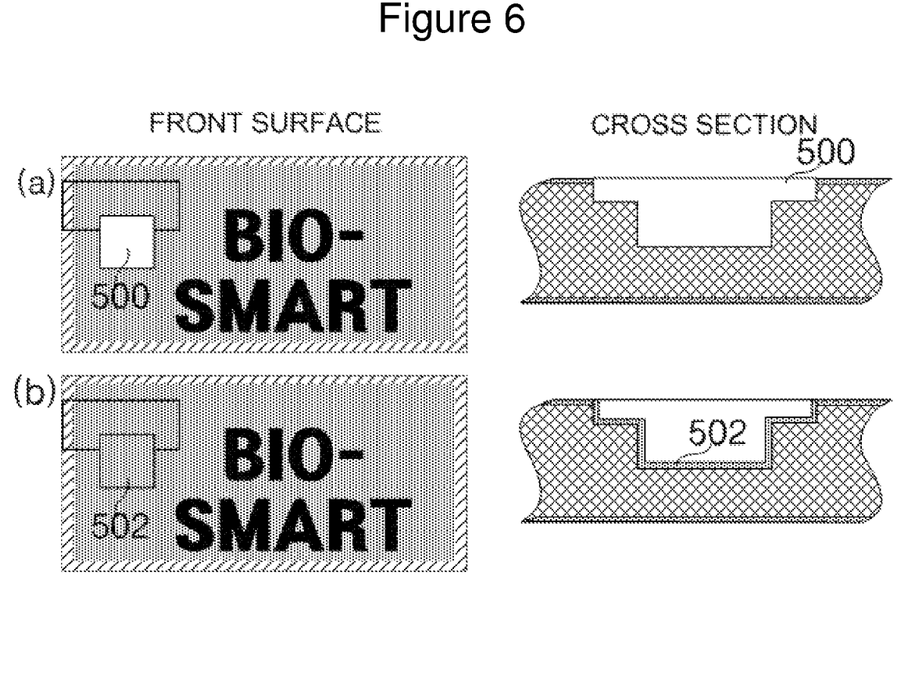
FIGS. 6 and 7 are diagrams exemplifying a process of attaching a contact IC chip on the metal card according to the first embodiment of the present invention.
Figure 7:
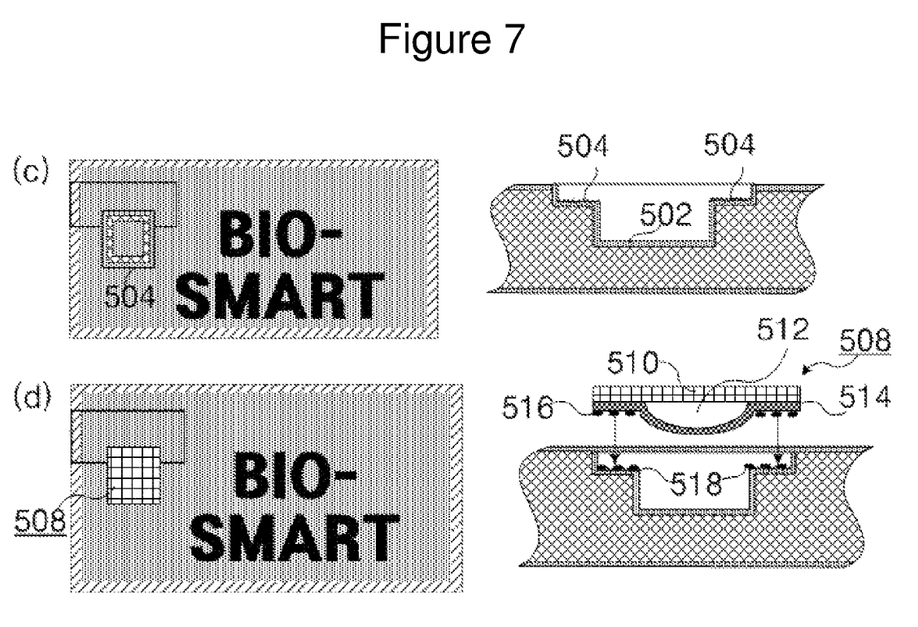

Now, a process of attaching a contact IC chip on a surface of the metal card according to the first embodiment of the present invention will be described with reference to FIGS. 5 to 7.

A contact IC chip attachment area is formed by etching a predetermined area of the front surface of the metal card sheet on which pattern is formed by performing multiple times of anodizing and etching (Step 400). Referring to (a) of FIG. 6, the etching corresponds to a size of the contact IC chip, and the etched area has a step shape having a shallow edge portion and a deep central portion. This is because the contact IC chip 508 including a circuit portion 512 can be allowed to be limitatively received.

Since duralumin is exposed from the etched area 500, an anodized layer 502 is formed by performing anodizing. The anodized layer 503 formed on the front surface of the etched area 500 is illustrated in (b) of FIG. 6.

In the anodized layer 502, an edge of the anodized layer being in contact with an attachment plane 514 formed on an edge of the back surface of the contact IC chip is roughened through laser sanding (Step 404). As illustrated in (c) of FIG. 7, the edge 504 of the anodized layer 503 being in contact with the attachment plane 514 formed on the edge of the back surface of the contact IC chip 508 is roughened.

Next, the roughened edge 504 and the edge of the back surface of the contact IC chip 508 are applied with adhesive resins 516 and 518 (Step 406). After the contact IC chip 508 and the metal card sheet are laminated, the contact IC chip 508 and the metal card sheet are attached through thermal pressing (Step 408).

In the present invention, the metal card sheet and a metal contact terminal of the contact IC chip 508 can be insulated from each other through the anodized layer 502, and an adhesive force can be improved through the roughening of the anodized layer 502.

In addition, in order to improve the adhesive force between the anodized layer 502 and the contact IC chip 508, a primer may be further applied on the roughened portion.

<Magnetic Film/Signature Plate Attaching Process>

In the present invention, first and second schemes are proposed for stably attaching the back-surface attachment member such as a magnetic film and a signature plate on the metal card sheet.

In the first scheme, magnetic-film attachment area and signature-plate attachment area of the metal card sheet are formed through etching, and magnetic-film and signature-plate attachment members are attached on the etched area.

In the second scheme, areas corresponding to shapes of the magnetic film and signature plate of the metal card sheet are roughened through laser sanding, and after that, back-surface attachment members such as a magnetic film and a signature plate are transferred.

<First Scheme>

Figure 8:
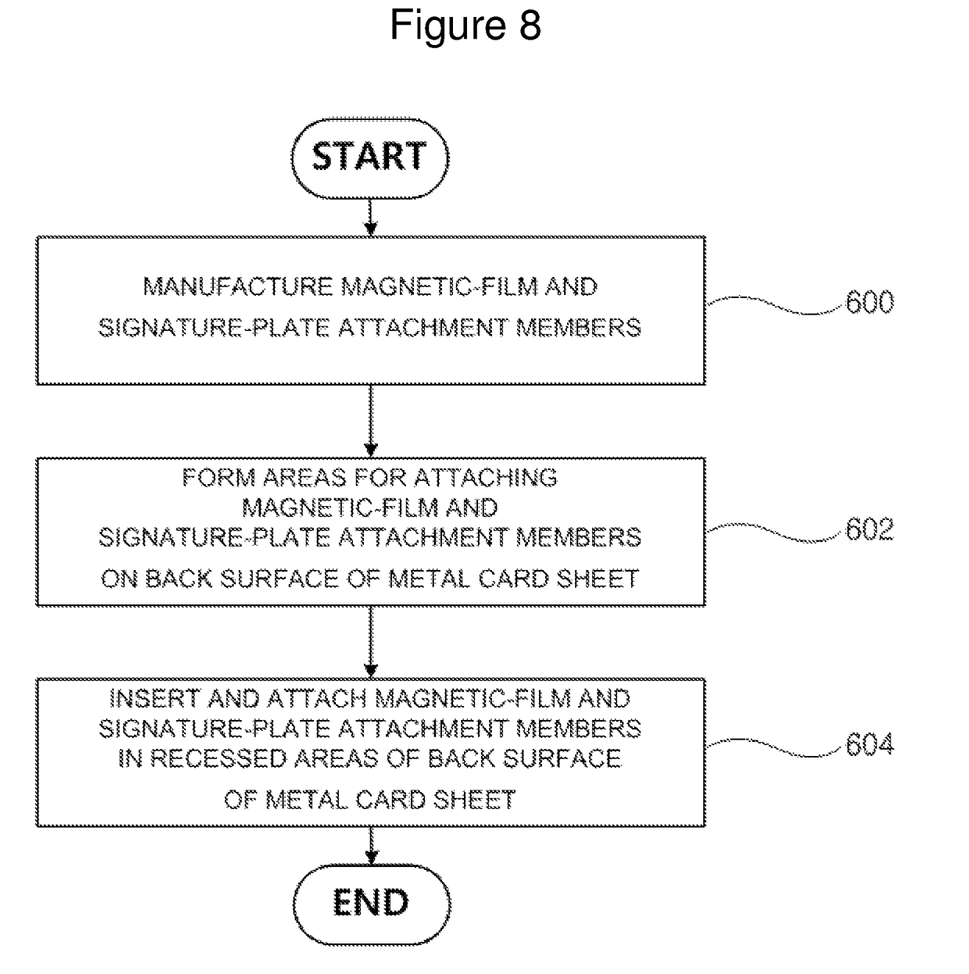
FIG. 8 is a diagram illustrating a first scheme of a process of attaching a magnetic film and a signature plate on the metal card according to the first embodiment of the present invention.

A magnetic film/signature plate attaching process according to the first scheme will be described with reference to FIGS. 8 and 10.

First, magnetic-film and signature-plate attachment members are manufactured (Step 600). The magnetic-film and signature-plate attachment members are manufactured by the same processes as those illustrated in FIG. 9.

Figure 9:
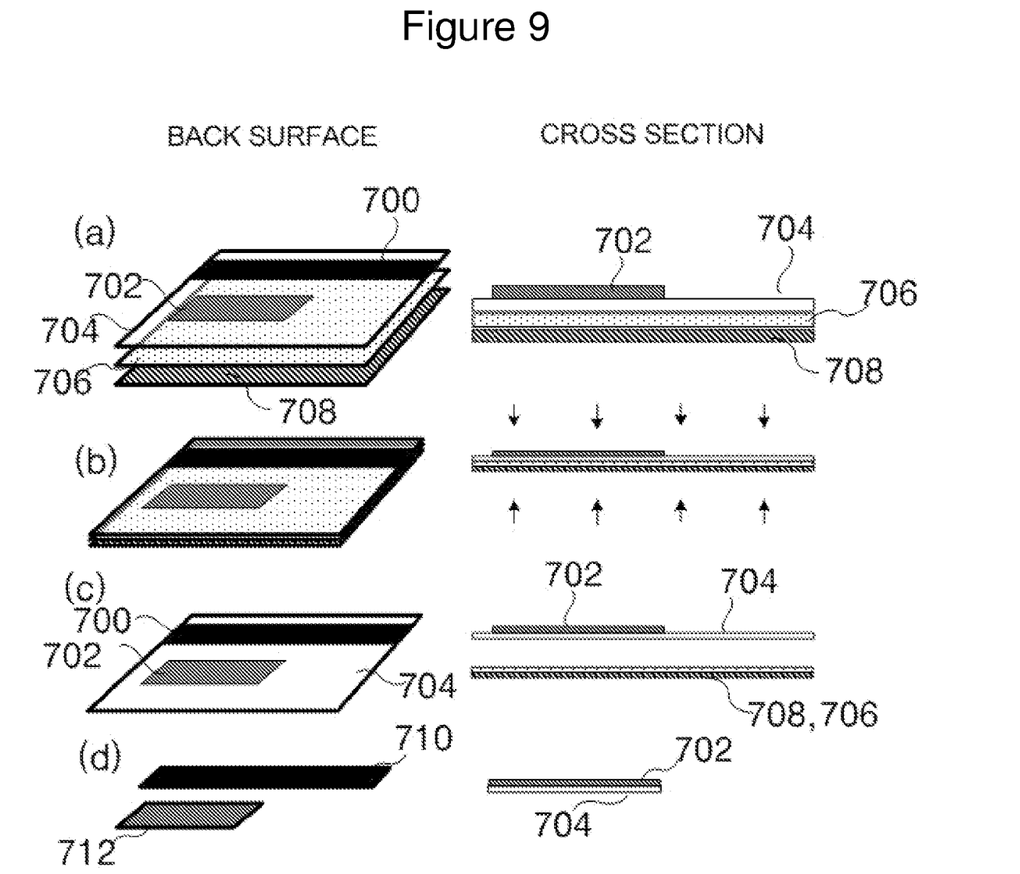
FIG. 9 is a diagram illustrating a process of manufacturing magnetic-film and signature-plate attachment members according to the first embodiment of the present invention.

As illustrated in (a) of FIG. 9, a magnetic film 700 and a signature plate 702 are laminated on a front surface of a base sheet 704, and a separating sheet 706 and a core sheet 708 are laminated on a back surface of the base sheet 704. As the base sheet 704, a transparent sheet, a white sheet, or a colored sheet may be employed.

Next, as illustrated in (b) of FIG. 9, the laminated material is thermally pressed.

Next, as illustrated in (c) of FIG. 9, the separating sheet 706 is separated from the base sheet 704, so that the magnetic film 700 and the signature plate 702 are combined with the base sheet 704.

Next, the resulting product is punched as shapes corresponding to the magnetic film 700 and the signature plate 702. Through the punching, the magnetic-film attachment member 710 and signature-plate attachment member 712 are manufactured. Namely, the magnetic-film and signature-plate attachment members 710 and 712 are formed by combining the magnetic film and signature plate 700 and 702 with the base sheet 704 through the thermal pressing.

As described above, after the magnetic-film attachment member 710 and signature-plate attachment member 712 are manufactured, magnetic-film attachment area 800 and signature-plate attachment area 802 are formed by etching a predetermined area of the back surface of the metal card sheet (Step 602). As illustrated in (a) of FIG. 10, the magnetic-film and signature-plate attachment areas 800 and 802 are etched so as to have a size and thickness corresponding to the size and thickness of the magnetic-film and signature-plate attachment members 710 and 712. Therefore, the magnetic-film and signature-plate attachment members 710 and 712 can be allowed to be received in the magnetic-film and signature-plate attachment areas 800 and 802.

Figure 10:
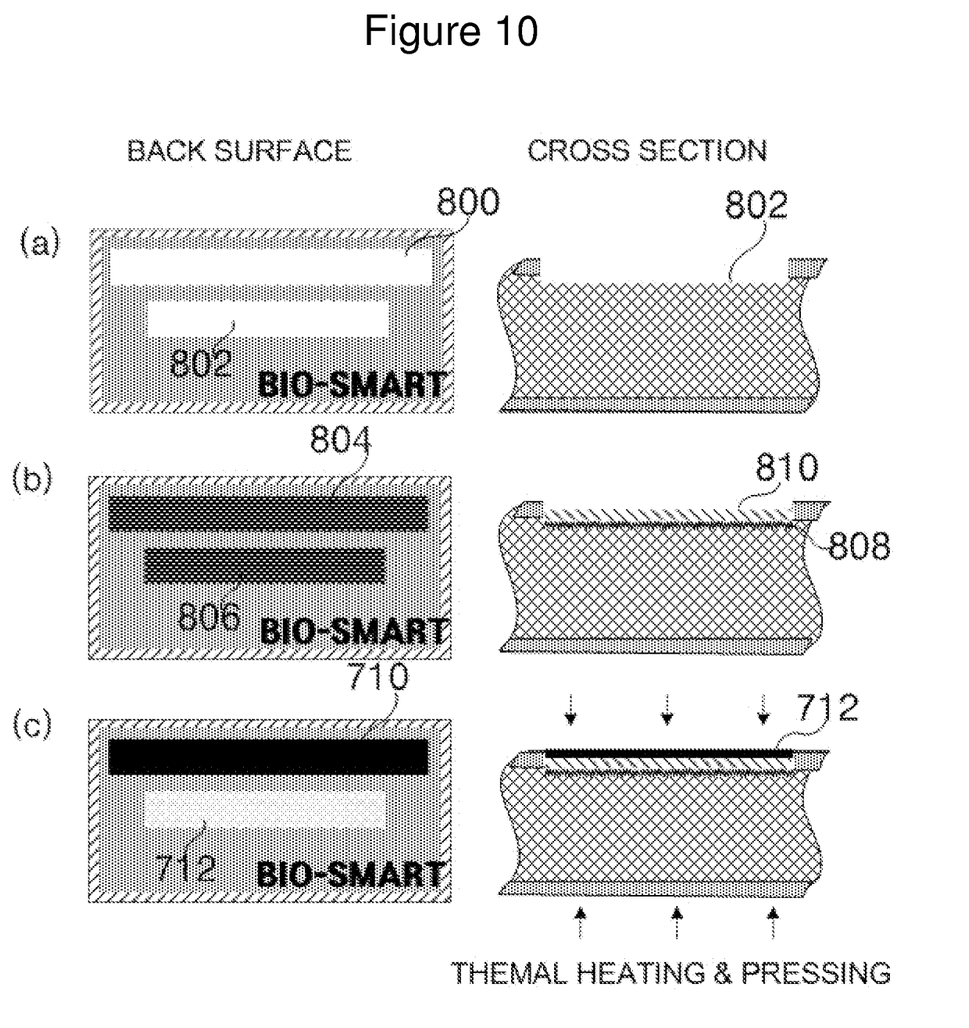
FIG. 10 is a diagram illustrating a process of attaching magnetic-film and signature-plate attachment members on the metal card according to the first embodiment of the present invention.

In order to improve an adhesive force with respect to the magnetic-film and signature-plate attachment areas 800 and 802, as illustrated in (b) of FIG. 10, the magnetic-film and signature-plate attachment areas 800 and 802 are roughened through laser sanding, and after that, a primer 810 may be applied. These processes may be selectively performed.

Next, after the magnetic-film and signature-plate attachment areas 800 and 802 are applied with an adhesive, the magnetic-film and signature-plate attachment areas 800 and 802 are inserted into the magnetic-film and signature-plate attachment members 710 and 712. The magnetic-film and signature-plate attachment members 710 and 712 are attached on the metal card sheet through thermal pressing.

<Second Scheme>

Figure 11:
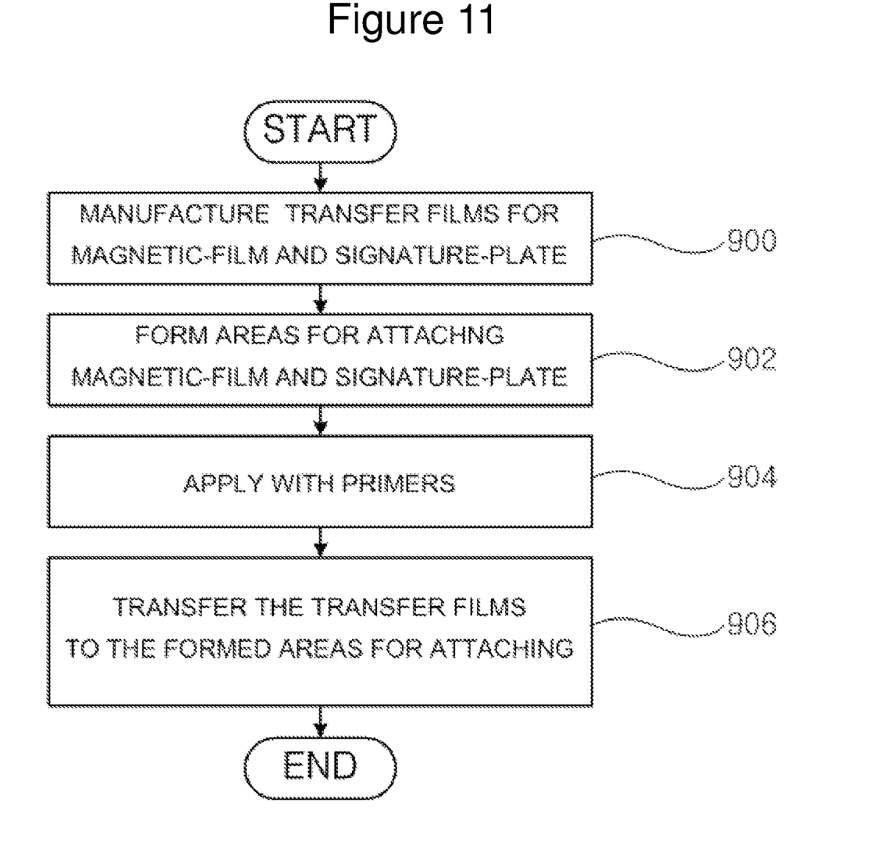
FIG. 11 is a diagram illustrating a second scheme of a process of attaching a magnetic film and a signature plate on the metal card according to the first embodiment of the present invention.
Figure 12:
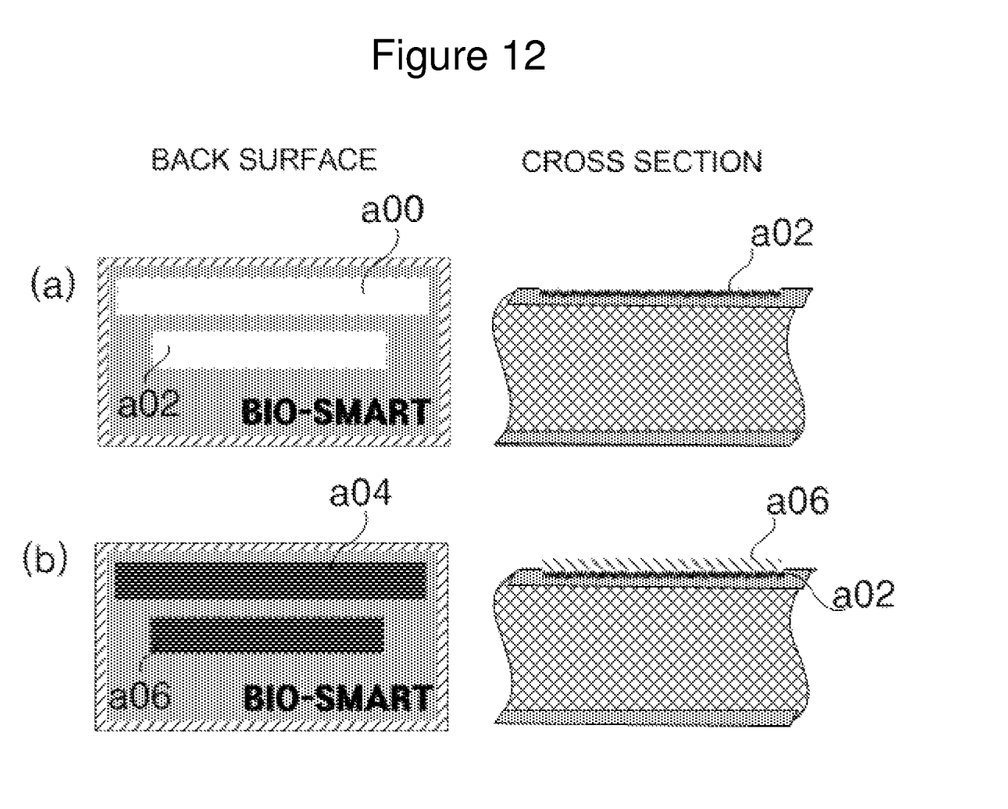
FIGS. 12 and 13 are diagrams illustrating a process of attaching a magnetic film and a signature plate on the metal card according to the first embodiment of the present invention.

The magnetic film/signature plate attaching process according to a second scheme will be described with reference to FIGS. 11 to 13.

A magnetic-film and signature-plate transfer films are manufactured (Step 900). The magnetic-film and signature-plate transfer films is formed by attaching a magnetic film and a signature plate on a separating film after the thermal pressing.

Next, magnetic-film and signature-plate attachment areas are formed by roughening predetermined areas of the back surface of the metal card sheet through laser sanding (Step 902). Referring to (a) of FIG. 12, the anodized layers of the magnetic-film and signature-plate attachment areas a00 and a02 are roughened through laser sanding.

Primers are applied on the front surfaces of the anodized layers of the magnetic-film and signature-plate attachment areas a00 and a02 (Step 904). Referring to (b) of FIG. 12, primers 104 and a06 are applied on the front surfaces of the laser-sanded magnetic-film and signature-plate attachment areas a00 and a02.

Figure 13:
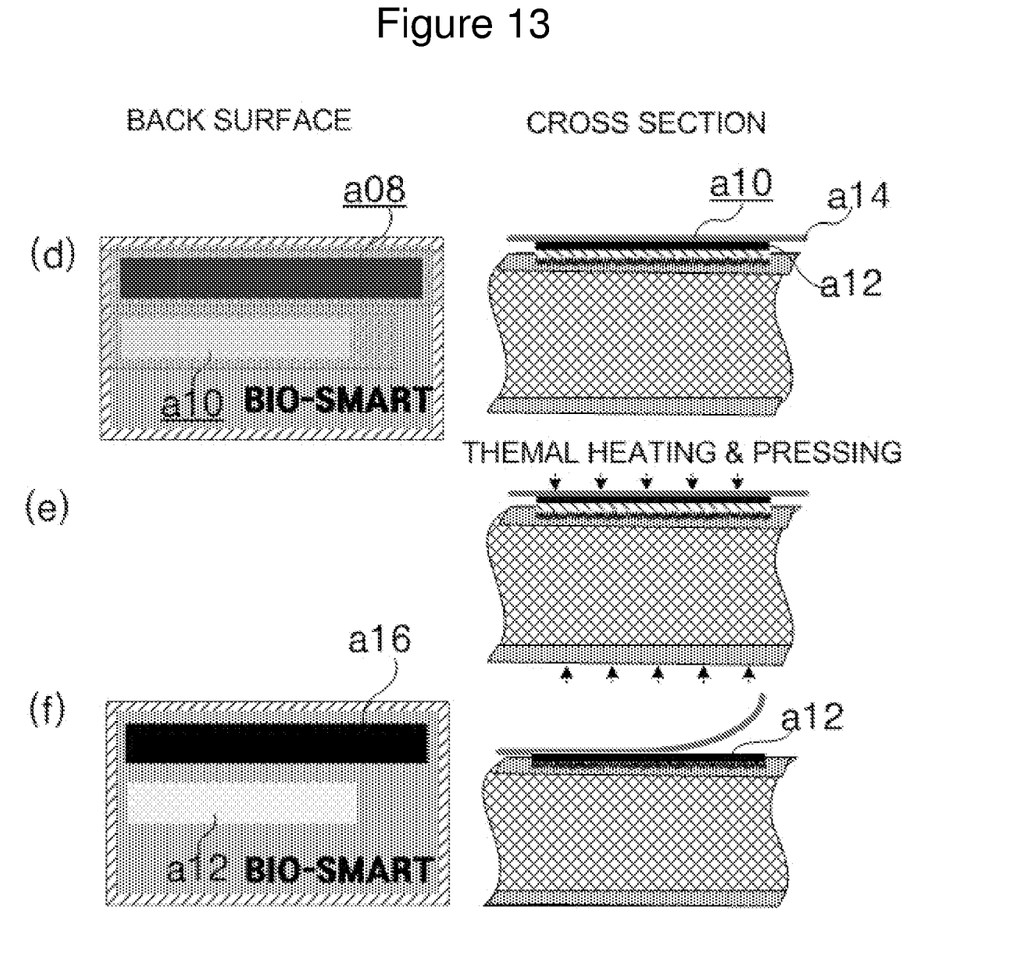

After the primers a04 and a06 are applied, as illustrated in (c) to (e) of FIG. 13, the magnetic-film and signature-plate transfer films a08 and a10 are laminated corresponding to the magnetic-film and signature-plate attachment areas a00 and a02, and thermal pressing is performed.

Next, the separating film a14 is removed from the magnetic-film and signature-plate transfer films a08 and a10, the magnetic film and the signature plate a16 and a12 are transferred to magnetic-film and signature-plate attachment areas of the back surface of the metal card sheet.

<Structure of Metal Card>

Figure 14:
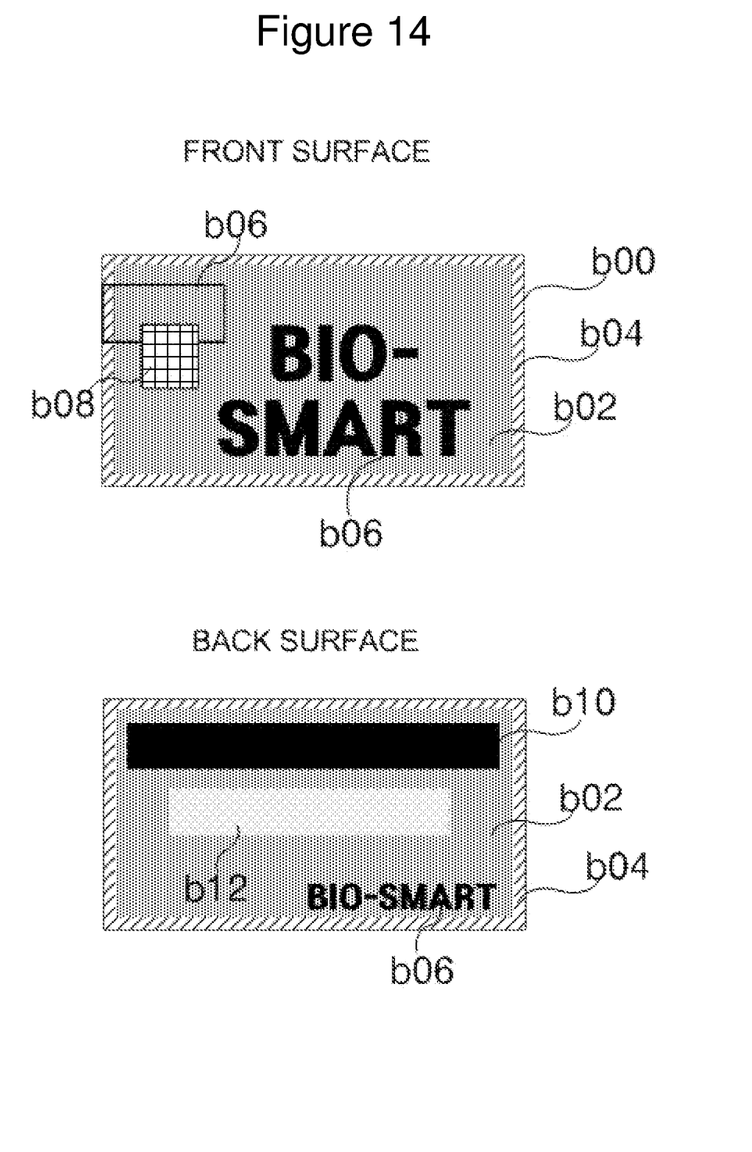
FIG. 14 is a diagram illustrating front and rear surfaces of metal cards according to first and second embodiments of the present invention.

A structure of the metal card manufactured according to the above-described methods will be described in detail with reference to FIG. 14.

An anodized layer is formed on a surface of the metal card b00. A background color b02 and first and second patterns b04 and b06 are formed by repetitively performing multiple times of anodizing and etching by using electrolytes having different compositions.

A contact IC chip attachment area is disposed on the front surface of the metal card b00. The contact IC chip attachment area is anodized and etched as an etched area having a space capable of receiving the contact IC chip and insulated. The contact IC chip b08 is attached on the insulated contact IC chip attachment area.

In addition, magnetic-film and signature-plate attachment areas are disposed on the back surface of the metal card b00. The magnetic-film and signature-plate attachment areas are formed as etched area through etching. Magnetic-film and signature-plate attachment members b10 and b12 manufactured by combining the magnetic film and the signature plate with a base sheet are attached on the magnetic-film and signature-plate attachment areas through an adhesive.

Alternatively, the magnetic-film and signature-plate attachment areas disposed on the back surface of the metal card b00 may be roughened as a sanding area through laser sanding. The magnetic film and the signature plate may be transferred to the magnetic-film and signature-plate attachment areas.

In the above-described first embodiment of the present invention, only the magnetic film and signature plate are exemplified as the back-surface attachment members attached on the back surface of the metal card. However, various back-surface attachment members such as hologram films may be added according to types of the metal cards. Since the addition and attachment of the back-surface attachment members are obvious in the present invention, the detailed description thereof will be omitted.

In addition, in the above-described first embodiment of the present invention, only the back-surface attachment members attached on the back surface of the metal card is exemplified. However, front-surface attachment members may be added according to types of the metal cards. In addition, the front-surface attachment members may be attached through the method of attaching the back-surface attachment members according to the present invention. Since the attachment of the front-surface attachment members is obvious in the present invention, the detailed description thereof will be omitted.

In addition, in the above-described first embodiment of the present invention, after the background color and pattern are formed on the surface of the metal card sheet through the anodizing, the area for inserting and attaching the contact IC chip is etched, and the duralumin exposed through the anodizing is anodized again.

However, in order to simplify the process of manufacturing a metal card, before the background color and pattern are formed through the anodizing, the area for attaching the contact IC chip may be etched, and after that, the etched area may be anodized during the anodizing for forming the background color and pattern. This will be described more in detail in a second embodiment.

Second Embodiment

Metal Card Manufacturing Process

Figure 15:
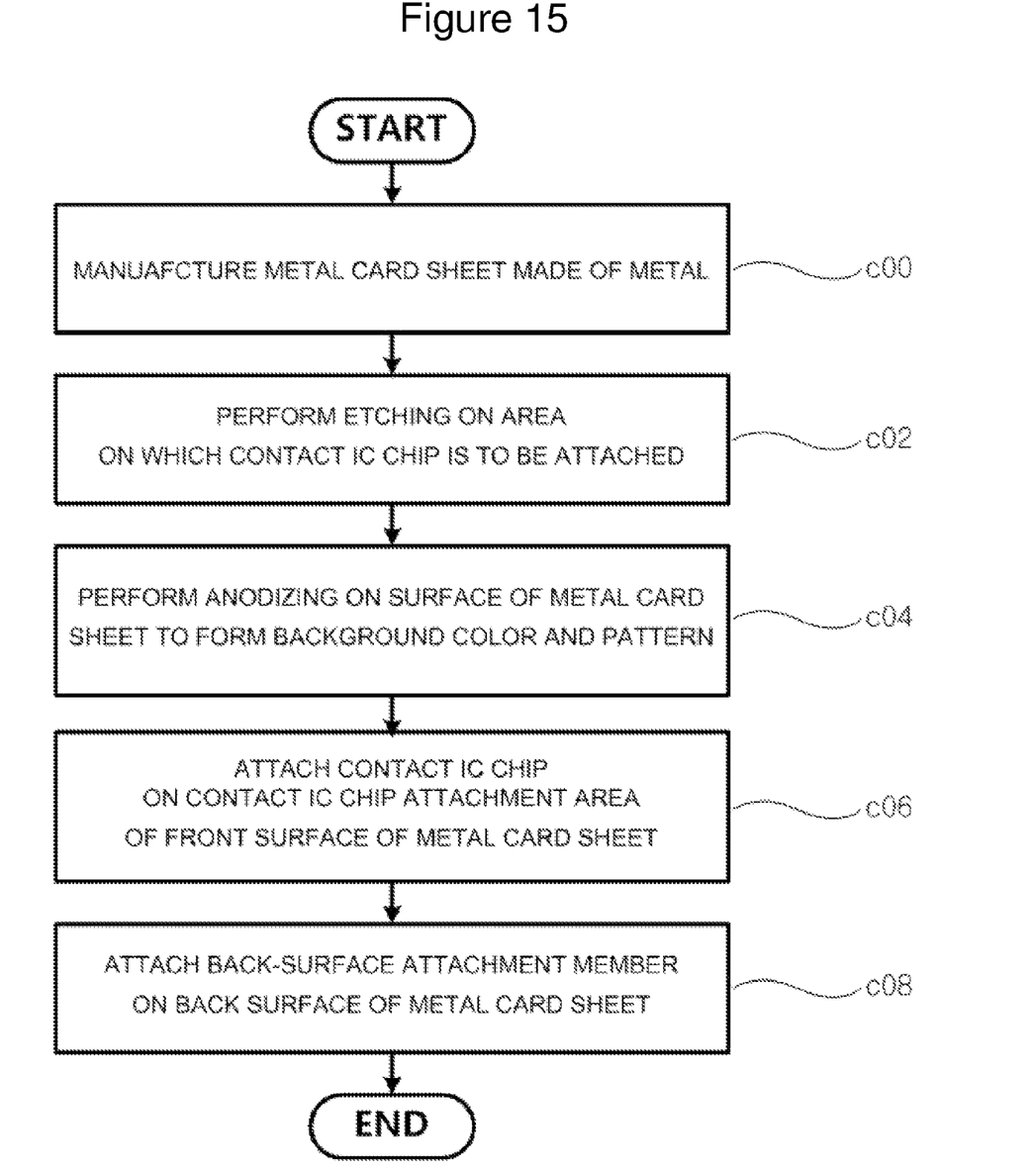
FIG. 15 is a diagram illustrating a process of manufacturing a metal card according to the second embodiment of the present invention.

Referring to FIG. 15 illustrating a metal card manufacturing process according to a second embodiment of the present invention, first, a duralumin metal card sheet is manufactured in order to manufacture a metal card (Step c00).

An area having a step shape having a size and depth capable of receiving a contact IC chip is formed on a front surface of a metal card sheet by performing etching on an area on which the contact IC chip is attached (Step c02).

An anodized layer is formed by performing multiple times of anodizing and etching on the surface of the duralumin metal card sheet and the step-shaped etched area, so that a background color and pattern are formed and the surface of the metal card sheet is insulated (Step c04).

On the front surface of the metal card sheet on which the background color and pattern are formed, after the etched area is applied with an adhesive resin, the contact IC chip is inserted, and after that, thermal pressing is performed, so that the contact IC chip is attached on the contact IC chip attachment area of the metal card sheet (Step c06).

Next, on a back surface of the metal card sheet, a back-surface attachment member such as a magnetic film and a signature plate is attached on a magnetic film/signature plate attachment area (Step c08).

As a result, the metal card according to the second embodiment of the present invention is manufactured.

INDUSTRIAL APPLICABILITY

According to the present invention, a metal card can be manufactured.

The invention claimed is:

1. A metal card comprising: a metal card sheet made of duralumin;
an anodized layer formed by anodizing a surface of the metal card sheet; and a contact IC chip attached on a first etched area through an adhesive, the first etched area being formed on a front surface of the metal card sheet on which the anodized layer is formed,
wherein a background color or pattern of the metal card is determined according to a composition of electrolyte of the anodizing for forming the anodized layer, wherein the first etched area is formed as a shape configured to receive the contact IC chip by performing etching before the anodizing, or the first etched area is formed as a shape configured to receive the contact IC chip by performing etching after the anodizing and performing anodizing the etched portion, and wherein the shape of the first etched area is a step shape having a shallow edge portion and a deep central portion.

2. The metal card according to claim 1, wherein a contact portion of the first etched area being in contact with the contact IC chip is roughened through laser sanding, or a contact portion of the first etched area being in contact with the contact IC chip is roughened through laser sanding and is applied with a primer.

3. The metal card according to claim 1, further comprising a back-surface attachment member attached on a second etched area through an adhesive, the second etched area being formed on a back surface of the metal card sheet on which the anodized layer is formed,
wherein the second etched area is formed by performing etching so as to have a size and depth capable of receiving the back-surface attachment member, and
wherein the back-surface attachment member is one or more of a member formed by combining a magnetic film with a base sheet, a member formed by combining a signature plate with a base sheet, and a member formed by combining a hologram film with a base sheet.

4. The metal card according to claim 3, wherein the second etched area is roughened through laser sanding or the second etched area is roughened through the laser sanding and, after that, is applied with a primer.

5. The metal card according to claim 1, further comprising a back-surface attachment member transferred to a sanded area formed on a back surface of the metal card sheet on which the anodized layer,
wherein the sanded area is formed by roughening an area corresponding to a size of the back-surface attachment member through laser sanding, and
wherein the back-surface attachment member is transferred by laminating a transfer film, on which one or more of a magnetic film, a signature plate, and a hologram film is formed, on the sanded area and performing thermal pressing.

6. The metal card according to claim 5, wherein the sanded area is further applied with a primer.

7. A method of manufacturing a metal card, comprising:
manufacturing metal card sheet using a duralumin;
anodizing a surface of the metal card sheet with electrolyte to form an anodized layer on the surface of the metal card sheet,
forming a first etched area by etching a first area of a front surface of the metal card sheet on which the anodized layer is formed,
anodizing a surface of the first etched area,
applying the anodized first etched area with an adhesive, and
attaching a contact IC chip on the first etched area,
wherein the first etched area has a step shape having a shallow edge portion and a deep central portion so as to receive the contact IC chip,
wherein a composition of the electrolyte is determined according to a background color and pattern of the metal card.

8. The method according to claim 7, further comprising roughening a contact portion of the first etched area being in contact with the contact IC chip through laser sanding before the attachment of the contact IC chip.

9. The method according to claim 8, further comprising applying the roughened portion of the first etched area with a primer before the attachment of the contact IC chip.

10. The method according to claim 7, further comprising
forming a second etched area by etching a second area of a back surface of the metal card sheet on which the anodized layer is formed; and
attaching a back-surface attachment member on the second etched area through an adhesive,
wherein the second etched area is formed so as to have a size and thickness capable of receiving the back-surface attachment member, and
wherein the back-surface attachment member is one or more of a member formed by combining a magnetic film with a base sheet, a member formed by combining a signature plate with a base sheet, and a member formed by combining a hologram film with a base sheet.

11. The method according to claim 10, further comprising roughening the second etched area through laser sanding before attaching the back-surface attachment member.

12. The method according to claim 11, further comprising applying the roughened second etched area with a primer before attaching the back-surface attachment member.

13. The method according to claim 7, further comprising:
forming a sanded area formed by roughening a second area of a back surface of the metal card sheet, on which the anodized layer is formed, through laser sanding; and
laminating a transfer film, on which a back-surface attachment member is formed, on the sanded area, and after that, transferring the back-surface attachment member through thermal pressing,
wherein a size of the sanded area corresponds to a size of the back-surface attachment member, and
wherein the back-surface attachment member is one or more of a magnetic film, a signature plate, and a hologram film.

14. The method according to claim 13, further comprising applying the sanded area with a primer before the transferring of the back-surface attachment member.

15. A method of manufacturing a metal card, comprising:
manufacturing metal card sheet using a duralumin;
forming a first etched area by etching a first area of a front surface of the metal card sheet before the anodizing;
anodizing a surface of the metal card sheet with electrolyte to form an anodized layer on the surface of the metal card sheet; and
applying the first etched area with an adhesive, and after that, attaching a contact IC chip on the first etched area after the anodizing,
wherein the first etched area has a step shape having a shallow edge portion and a deep central portion so as to receive the contact IC chip, and
wherein a composition of the electrolyte is determined according to a background color and pattern of the metal card.

* * * * *